United States Patent
Teener et al.

(10) Patent No.: US 8,713,128 B2
(45) Date of Patent: Apr. 29, 2014

(54) METHOD AND SYSTEM FOR UTILIZING NATIVE ETHERNET AS A VIRTUAL MEMORY INTERCONNECT

(75) Inventors: Michael Johas Teener, Santa Cruz, CA (US); Bruce Currivan, Dove Canyon, CA (US); Wael William Diab, San Francisco, CA (US); Jeyhan Karaoguz, Irvine, CA (US); Yongbum Kim, San Jose, CA (US); Kenneth Ma, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 891 days.

(21) Appl. No.: 12/710,168

(22) Filed: Feb. 22, 2010

(65) Prior Publication Data

US 2011/0022679 A1 Jan. 27, 2011

Related U.S. Application Data

(60) Provisional application No. 61/228,285, filed on Jul. 24, 2009.

(51) Int. Cl.
  *G06F 15/167* (2006.01)
  *G06F 15/173* (2006.01)
  *H04L 12/28* (2006.01)
  *G06F 3/00* (2006.01)

(52) U.S. Cl.
  USPC ........... 709/216; 709/217; 709/218; 709/223; 709/245; 370/389; 710/8

(58) Field of Classification Search
  USPC .......... 709/216, 217, 218, 223, 245; 370/389; 710/8
  See application file for complete search history.

(56) References Cited

U.S. PATENT DOCUMENTS

| | | | | |
|---|---|---|---|---|
| 6,735,773 | B1 * | 5/2004 | Trinh et al. | 719/328 |
| 7,284,664 | B1 * | 10/2007 | Ivchenko et al. | 209/250 |
| 7,325,075 | B1 * | 1/2008 | Chiu | 709/245 |
| 7,783,788 | B1 * | 8/2010 | Quinn et al. | 710/8 |
| 8,307,048 | B2 * | 11/2012 | Brown et al. | 709/217 |
| 2004/0148382 | A1 * | 7/2004 | Narad et al. | 709/223 |
| 2004/0179521 | A1 | 9/2004 | Kim et al. | |
| 2005/0132022 | A1 * | 6/2005 | Azagury et al. | 709/218 |
| 2005/0187939 | A1 * | 8/2005 | Krithivas | 707/10 |
| 2005/0251522 | A1 * | 11/2005 | Clark | 707/100 |
| 2009/0201926 | A1 * | 8/2009 | Kagan et al. | 370/389 |
| 2010/0017497 | A1 * | 1/2010 | Brown et al. | 709/217 |

* cited by examiner

*Primary Examiner* — David Lazaro
*Assistant Examiner* — Vitalki Korobov
(74) *Attorney, Agent, or Firm* — Brinks Gilson & Lione

(57) ABSTRACT

In various embodiments of a method and system for utilizing native Ethernet as a virtual memory interconnect, a first networking device may be operable to transcode a memory read command and/or a memory write command to memory access information and encapsulate the memory access information within in one or more fields of an Ethernet frame. The memory access information may be communicated over an Ethernet link to a second networking device where it may be utilized to access memory that is associated with the memory read command and/or the memory write command. For example, the memory access information may indicate an address of the memory to be accessed, whether a read operation and/or a write operation is to be performed, whether the frame comprises data to be written to the memory, and/or whether a locally administered address space is utilized.

12 Claims, 5 Drawing Sheets

METHOD AND SYSTEM FOR UTILIZING NATIVE ETHERNET AS A VIRTUAL MEMORY INTERCONNECT

CROSS-REFERENCE TO RELATED APPLICATIONS/INCORPORATION BY REFERENCE

This patent application makes reference to, claims priority to and claims benefit from U.S. Provisional Patent Application Ser. No. 61/228,285 filed on Jul. 24, 2009.

The above stated application is hereby incorporated herein by reference in its entirety.

FIELD OF THE INVENTION

Certain embodiments of the invention relate to networking. More specifically, certain embodiments of the invention relate to a method and system for utilizing native Ethernet as a virtual memory interconnect.

BACKGROUND OF THE INVENTION

Today's local area networks are based predominantly on Ethernet (IEEE 802.3) technology. The popularity of Ethernet means that there is an abundance of Ethernet equipment exists in the marketplace and Ethernet compatibility means the ability to communicate with a vast number of existing devices and networks. Furthermore, the near commoditization of Ethernet has led to Ethernet being perhaps the most affordable networking/communications technology available. Accordingly, when choosing connectivity options, Ethernet is often a first choice of system designers and network administrators. However, there are many applications and/or product spaces for which Ethernet is not currently adapted or well-suited.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing native Ethernet as a virtual memory interconnect, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing native Ethernet as a virtual memory interconnect. In various embodiments of the invention, a memory read command and/or a memory write command may be transcoded to memory access information and encapsulated within in one or more fields of an Ethernet frame. The memory access information may be communicated over an Ethernet link to a second networking device where it may be utilized to access memory that is associated with the memory read command and/or the memory write command. For example, the memory access information may indicate an address of the memory to be accessed, whether a read operation and/or a write operation is to be performed, and/or whether the frame comprises data to be written to the memory. Exemplary fields of the frame comprise one or more of: a destination address field, an Ethertype field, a payload field, and/or a subtype field. The destination address field may indicate that a locally administered address space is utilized.

Upon receiving the Ethernet frame, the second networking device may determine, based on one or more fields of the received Ethernet frame, whether the received Ethernet frame comprises a memory read command and/or a memory write command that was previously transcoded and encapsulated within the received Ethernet frame. Based on a result of the determination, a memory read operation and/or a memory write operation may be performed on the memory to be accessed. In instances that the Ethernet frame comprises a memory read command, a second Ethernet frame comprising data read-out from the memory may be generated and communicated to the first networking device.

Figure 1A:
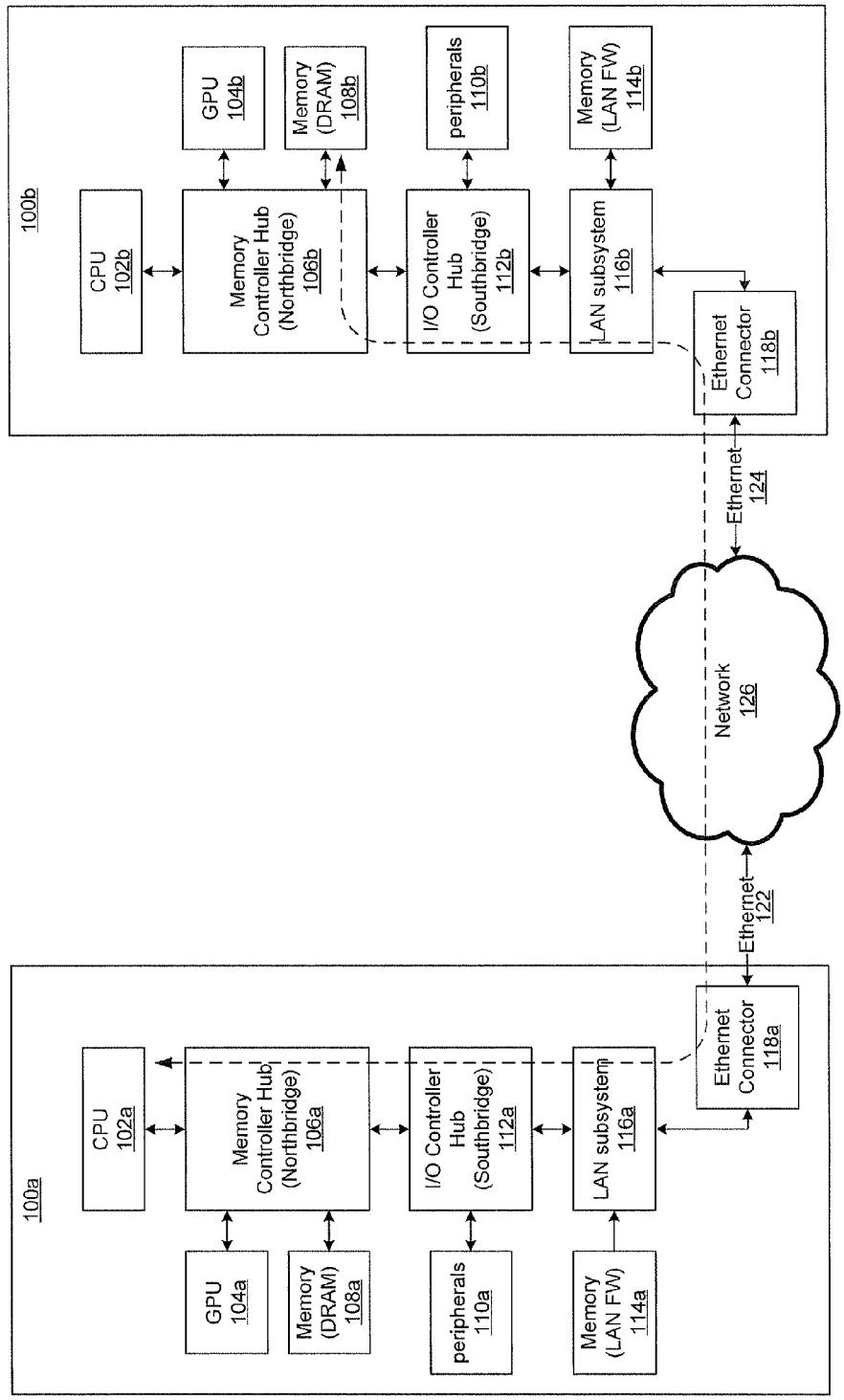
FIGS. 1A and 1B is a diagram illustrating memory access over native Ethernet, in accordance with an embodiment of the invention.

FIG. 1A is a diagram illustrating memory access over native Ethernet, in accordance with an embodiment of the invention. Referring to FIG. 1A each networking device 100 may comprise a CPU 102, a memory controller hub (MCH) 106, a graphics processing unit (GPU) 104, a memory 108, an input/output controller hub (ICH) 112, a LAN subsystem 116, an Ethernet connector 118 and memory 114.

The CPUs 102a and 102b, may each comprise suitable logic, circuitry, interfaces, and/or code that may be operable to process data and/or control operations of its corresponding networking device 100. In this regard, each of the CPUs 102a and 102b may be operable to provide control signals to the various other portions of its corresponding networking device 100. Each of the CPUs 102a and 102b may also be operable to run applications or programs and/or otherwise execute code. Each of the CPUs 102a and 102b may be accessed via a corresponding one of the MCHs 106a and 106b.

The MCHs 106a and 106b, may each comprise suitable logic, circuitry, interfaces, and/or code that may be operable to store and/or retrieve data at high data transfer rates. For example, each of the MCHs 106a and 106b may be operable to retrieve and/or store of digital video and/or graphics data for high performance applications, such as high definition video, high resolution 3-D graphics, etc. In various embodiments of the invention, each of the MCHs 106a and 106b may be referred to as a northbridge (NB). In various embodiments of the invention, each of the MCHs 106a and 106b may be operable to translate and/or map memory addresses.

The GPUs 104a and 104b, may each comprise suitable logic, circuitry, interfaces, and/or code that may be operable to generate, render, and/or manipulate graphics data. Each of the GPUs 104a and 104b may be operable to process and/or generate digital video and/or graphics. Each of the GPUs 104a and 104b may also be operable to output encrypted digital video and/or graphics for applications that utilize digital content protection, for example. Each of the GPUs 104a and 104b may be accessed via a corresponding one of the MCHs 106a and 106b.

The memories 108a and 108b, may each comprise suitable logic, circuitry, interfaces, and/or code that may be operable to store and/or provide access to data. For example, each of the memories 108a and 108b may be operable to store and/or retrieve instructions and/or data utilized and/or processed by a corresponding one of CPUs 102a and 102b and/or a corresponding one of GPUs 104a and 104b. Each of the memories 108a and 108b may also be operable to store data, for example, configuration data and/or state variables utilized in controlling and/or configuring various portions of the networking device 100. Each of the memories 108a and 108b may utilize various technologies, such as dynamic random access memory (DRAM), which enable data to be stored and/or retrieved at sufficiently high data rates to enable high performance multimedia applications, for example.

The ICHs 112a and 112b, may each comprise suitable logic, circuitry, interfaces, and/or code that may be operable to communicate data between a corresponding one the MCHs 106a and 106, a corresponding one of the LAN subsystems 116a and 116b, and/or peripheral devices 110 of the corresponding networking device 100. In various embodiments of the invention, each of the ICHs 112a and 112b may be referred to as a southbridge (SB).

The LAN subsystems 116a and 116b, may comprise suitable logic, circuitry, interfaces, and/or code to enable the transmission and/or reception of Ethernet frames. Each of the LAN subsystems 116a and 116b may be operable to perform PHY layer functions and MAC layer functions. Each of the LAN subsystems 116a and 116b may be operable to transmit and/or receive Ethernet frames at various transfer rates, such as 10 Mbps, 100 Mbps, 1 Gbps, 10 Gbps, 40 Gbps, 100 Gbps, or other data rates. Each of the LAN subsystems 116a and 116b may also enable transmission and/or reception of Ethernet frames via wireless LANs (WLAN).

Each of the LAN subsystems 116a and 116b may be operable to encapsulate and/or transcode memory read commands, memory write commands, and/or data read from memory to generate one or more Ethernet frames. The one or more Ethernet frames may comprise an Ethertype value, Ethertype Subtype value, and/or transaction identification number. The Ethertype value and/or Ethertype Subtype value may indicate that a memory read command, a memory write command, and/or data read from memory is encapsulated within the one or more Ethernet frames. The transaction identification number may identify data read from memory. For example, the transaction identification number may identify which read command the read data corresponds to.

Each of the LAN subsystems 116a and 116b may be operable to decapsulate and/or transcode one or more Ethernet frames to extract or recover one or more memory read commands, one or more memory write commands, and/or data read from memory. Each of the LAN subsystems 116a and 116b may be operable to inspect fields within an Ethernet frame. For example, each of the LAN subsystems 116a and 116b may be operable to inspect an EtherType field, EtherType SubType field of an Ethernet frame to determine whether the Ethernet frame comprises one or more memory read commands, one or more memory write commands, and/or data read from memory. Upon determining that the Ethernet frames comprise one or more memory read commands or one or more memory write commands, each of the LAN subsystems 116a and 116b may be operable to recover the commands. Upon determining that an Ethernet frame comprises data read from memory, each of the LAN subsystems 116a and 116b may be operable to inspect a transaction identification field of the Ethernet frame to determine which read command the read data corresponds to.

The PHY layer functions performed by each LAN subsystem 116 may enable transmission and reception of Ethernet frames via a communication medium. The PHY layer functions may generate signals for transmission that are suitable for the physical medium being utilized for transmitting the signals. For example, for an optical communication medium, the PHY layer may generate optical signals, such as light pulses, or for a wired communication medium, the PHY layer may generate voltage and/or current signals.

The MAC layer functions performed by each of the LAN subsystems 116a and 116b may enable orderly communication between systems that are communicatively coupled via a shared communication medium. The MAC layer may comprise one or more coordination functions (CF) that enable a networking device to determine when it may attempt to access the shared communication medium.

In various embodiments of the invention, the MAC layer functions performed by each of the LAN subsystems 116a and 116b may be operable to receive memory read commands, memory write commands, and/or data read from memory from a corresponding one of the ICHs 112a and 112b and generate one or more Ethernet frames comprising the memory read commands, memory write commands, and/or data read from memory. The MAC layer functions within each of the LAN subsystems 116a and 116b may also enable the reception of Ethernet frames from and the decapsulation of memory read commands, memory write commands, and/or data read from memory from the received Ethernet frames.

In various embodiments of the invention, each of the LAN subsystems 116a and 116b may be operable to utilize code, such as firmware, and/or data stored within a corresponding on of the memories 114a and 114b to enable the operation of MAC layer functions and/or PHY layer functions within an Ethernet LAN, for example. The firmware may also enable encapsulating and/or transcoding memory read commands, memory write commands, and/or data read from memory to generate Ethernet frames. In addition, the firmware may enable decapsulating and/or transcoding memory read commands, memory write commands, and/or data read from memory to generate Ethernet frames.

In operation, the CPU 102a, GPU 104a, and or other components of the networking device 100a may read from and/or write to the local memory 108a. Moreover, the CPU 102a, GPU 104a, and or other components may read from and/or write to the remote memory 108b over an Ethernet connection. In this regard, virtual memory addresses may be assigned to physical memory addresses of the memory 108a and 108b.

In an exemplary read operation, the CPU 102a may issue a command to read from a virtual memory address. The read command may be received by the MCH 106a and the MCH 106a may translate the virtual memory address to a physical memory address. In instances that the physical memory address is within the memory 108a, then the MCH 106a may convey the command to the memory 108a and, accordingly, may convey the read data from the memory 108a to the CPU 102a. In instances that the physical memory address is within the memory 108b, then the MCH 106a may convey the read command to the ICH 112a which may, in turn, convey the read command to the LAN subsystem 116a.

Upon receiving the read command from the ICH 112a, the LAN subsystem 116a may determine the traffic to be a read command and may transcode and/or encapsulate the command to generate a corresponding Ethernet frame. In some embodiments of the invention, the memory address may be placed in the destination address of the corresponding Ethernet frame and second most least significant bit of the first byte of the destination address may be set to '1' to indicate the use of a locally administered address space. In some embodiments of the invention, an Ethertype and/or Subtype field of the corresponding Ethernet frame may indicate that the frame comprises a memory read command. In some embodiments of the invention a transaction identification number field of the Ethernet frame may enable responses to the read command to be uniquely identified. That is, the transaction identification number may enable determining whether future frames comprising read data are in response to this read command or another read command.

The Ethernet frame may then be communicated to the networking device 100b via the Ethernet network 126. Upon arriving at the LAN subsystem 116b, the LAN subsystem 116b may inspect the frame and determine that the frame comprises a memory read command based on one or more of the destination address, Ethertype, and/or Subtype fields. The Ethernet frame may then be transcoded and/or de-capsulated to recover the read command, and the read command may be conveyed to the memory 108b via the ICH 112b and the MCH 106b.

In response to the read command, data may be output by the memory 108b. The MCH 106b may convey the read-out data to the ICH 112b and the ICH 112b may convey the read-out data to the LAN subsystem 116b. Upon receiving the read-out data from the ICH 112b, the LAN subsystem 116b may determine the traffic to be read-out data and may transcode and/or encapsulate the read-out data to generate one or more corresponding Ethernet frames. In some embodiments of the invention, the read-out data may be placed in the payload of the Ethernet frame(s). In some embodiments of the invention, an Ethertype and/or Subtype field of the corresponding Ethernet frame(S) may indicate that the frame comprises read-out data resulting from a read command. In some embodiments of the invention a transaction identification number field of the Ethernet frame may enable read responses may be uniquely identified. That is, for a frame comprising data read from memory, the transaction identification number may enable determining which read command the frame is in response to. The Ethernet frame(s) may then be communicated to the networking device 100a.

The networking device 100a may receive and process the frame(s) and determine that the frame(s) comprise data read out from memory 108b. In some embodiments of the invention, the transaction identification number may be utilized to correlate the returned read-out data with a particular memory read request. The read-out data may be extracted and/or recovered from the frame(s) and conveyed to the CPU 102a.

In an exemplary write operation, the CPU 102a may issue a command to write to a virtual memory address and may output corresponding data to be written to memory. The write command and associated to-be-written data may be received by the MCH 106a and the MCH 106a may translate the virtual memory address to a physical memory address. In instances that the physical memory address is within the memory 108a, then the MCH 106a may convey the write command and to-be-written data to the memory 108a. In instances that the physical memory address is within the memory 108b, then the MCH 106a may convey the write command and to-be-written data to the ICH 112a which may, in turn, convey the read command to the LAN subsystem 116a.

Upon receiving the write command and to-be-written data from the ICH 112a, the LAN subsystem 116a may determine the traffic to be a write command and to-be-written data and may transcode and/or encapsulate the command to generate a corresponding Ethernet frame. In some embodiments of the invention, the memory address may be placed in the destination address of one or more corresponding Ethernet frames and a second most least significant bit of the first byte of the destination address of each frame may be set to '1' to indicate the use of a locally administered address space. In some embodiments of the invention, an Ethertype and/or Subtype field of the corresponding Ethernet frames may indicate that the frame comprises a write command and/or to-be-written data.

The Ethernet frame may then be communicated to the networking device 100b via the Ethernet network 126. Upon arriving at the LAN subsystem 116b, the LAN subsystem 116b may inspect the frame(s) and determine that the frame comprises a memory write command and to-be-written data. The determination may be based on one or more of the destination address, Ethertype, and/or Subtype fields. The Ethernet frame(s) may then be transcoded and/or de-capsulated to recover the write command and to-be-written data, and the write command and to-be-written data may be conveyed to the memory 108b via the ICH 112b and the MCH 106b.

Figure 1B:
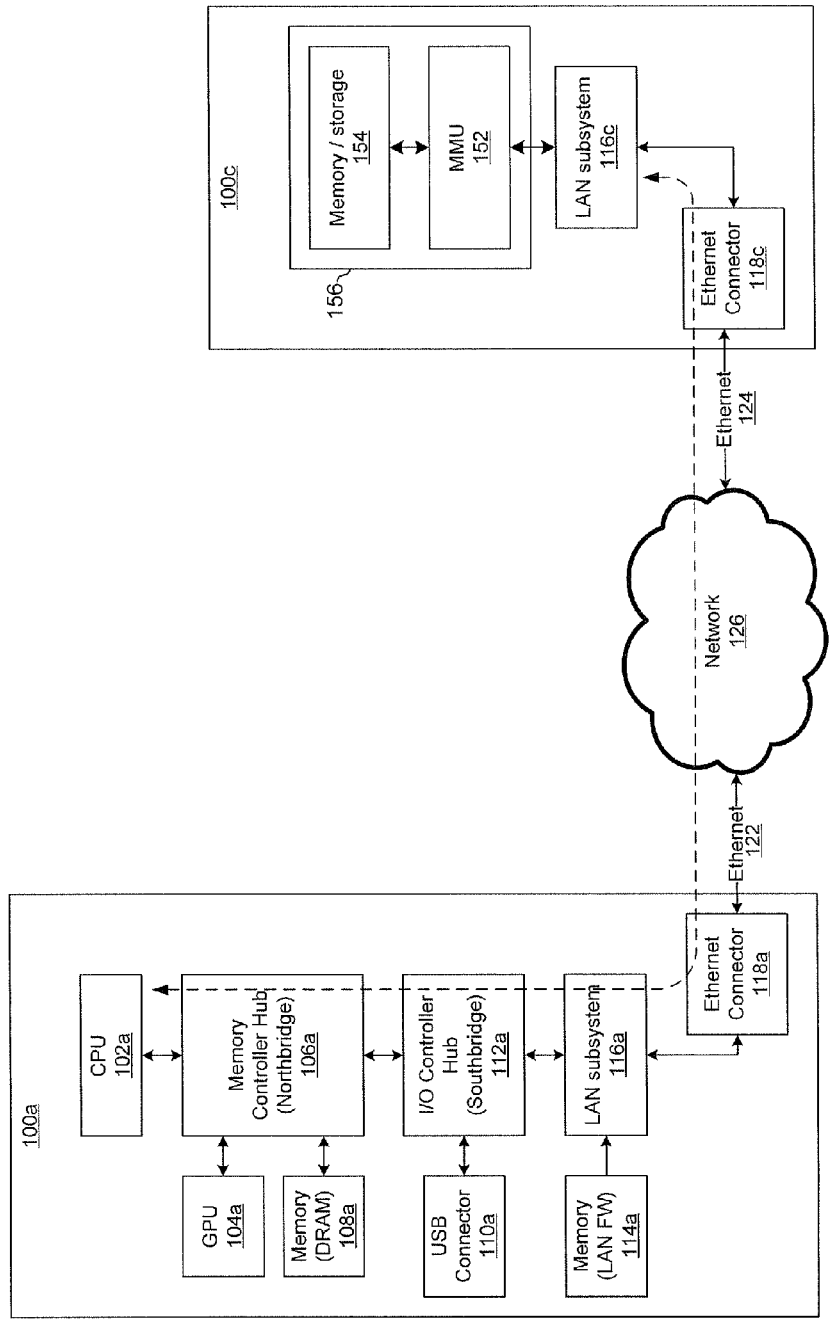

FIG. 1B is a diagram illustrating memory access over native Ethernet, in accordance with an embodiment of the invention. Referring to FIG. 1B there is shown the system 100a described with respect to FIG. 1B and there is shown a networking device 100c comprising a memory subsystem 156.

The system 100c may comprise suitable logic, circuitry, interfaces, and/or code such that memory subsystem 156 may be interact with the LAN subsystem 116c. The memory subsystem 156 may comprise a memory management unit 152 and memory 154. The memory management unit (MMU) 154 may comprise suitable logic, circuitry, interfaces, and/or code for reading from and/or writing to the memory 154 based on commands received from the LAN subsystem 116c. The memory 154 may comprise, for example, flash memory, magnetic storage, content addressable memory (CAM), DRAM, SRAM, ROM, EEPROM, and/or other memory elements. In some embodiments of the invention, the networking device 100c may comprise a system dedicated for storage. Exemplary dedicated storage systems may comprise flash drives, hard drives, personal media players, digital video recorders, and optical drives.

In an exemplary read operation, the CPU 102a may issue a command to read from a virtual memory address. In instances that the physical memory address is within the memory 154, then the MCH 106a may convey the read command to the ICH 112a which may, in turn, convey the read command to the LAN subsystem 116a.

Upon receiving the read command from the ICH 112a, the LAN subsystem 116a may determine the traffic to be a read command and may transcode and/or encapsulate the command to generate a corresponding Ethernet frame. In some embodiments of the invention, the memory address may be placed in the destination address of the corresponding Ethernet frame and second most least significant bit of the first byte of the destination address may be set to '1' to indicate the use of a locally administered address space. In some embodiments of the invention, an Ethertype and/or Subtype field of the corresponding Ethernet frame may indicate that the frame comprises a memory read command. In some embodiments of the invention a transaction identification number may be included in the Ethernet frame so that responses to the read command may be correlated with a particular read command.

The Ethernet frame may then be communicated to the networking device 100c via the Ethernet network 126. Upon arriving at the LAN subsystem 116c, the LAN subsystem 116c may inspect the frame and determine that the frame comprises a memory read command based on one or more of the destination address, Ethertype, and/or Subtype fields. The Ethernet frame may then be transcoded and/or de-capsulated to recover the read command, and the read command may be conveyed to the MMU 152. The MMU 152 may process the command and perform the read operation. The read-out data may be conveyed to the LAN subsystem 116c. The LAN subsystem 116c may determine the traffic to be read-out data and may transcode and/or encapsulate the read-out data to generate a corresponding Ethernet frame. In some embodiments of the invention, the read-out data may be placed in the payload of the Ethernet frame. In some embodiments of the invention, an Ethertype and/or a Subtype field of the corresponding Ethernet frame may indicate that the frame comprises read-out data resulting from a read command. In some embodiments of the invention, the transaction identification number of the frame comprising the read-out data may be set equal to the transaction identification number of the frame the carried the read command. In this manner, the read-out data may be correlated to a particular read command. The Ethernet frame(s) may then be communicated to the networking device 100a.

The networking device 100a may receive and process the frame(s) and determine that the frame(s) comprise data read out from memory 108b. The read-out data may be extracted and/or recovered from the frame(s) and conveyed to the CPU 102a. In some embodiments of the invention, the transaction identification number may be utilized to correlate the read-out data with a particular memory read request.

In an exemplary write operation, the CPU 102a may issue a command to write to a virtual memory address and may output corresponding data to be written to memory. In instances that the physical memory address is within the memory 154, then the MCH 106a may convey the write command and to-be-written data to the ICH 112a which may, in turn, convey the read command to the LAN subsystem 116a.

Upon receiving the write command and to-be-written data from the ICH 112a, the LAN subsystem 116a may determine the traffic to be a write command and to-be-written data and may transcode and/or encapsulate the command to generate a corresponding Ethernet frame. In some embodiments of the invention, the memory address may be placed in the destination address of one or more corresponding Ethernet frames and a second most least significant bit of the first byte of the destination address of each frame may be set to '1' to indicate the use of a locally administered address space. In some embodiments of the invention, an Ethertype and/or Subtype field of the corresponding Ethernet frames may indicate that the frame comprises a write command and/or to-be-written data.

The Ethernet frame may then be communicated to the networking device 150 via the Ethernet network 126. Upon arriving at the LAN subsystem 116c, the LAN subsystem 116c may inspect the frame(s) and determine, based on one or more of the destination address, Ethertype, and/or Subtype fields, that the frame comprises a memory write command and to-be-written data. The Ethernet frame(s) may then be transcoded and/or de-capsulated to recover the write command and to-be-written data, and the write command and to-be-written data may be conveyed to the memory 154 via the MMU 152.

Figure 2:
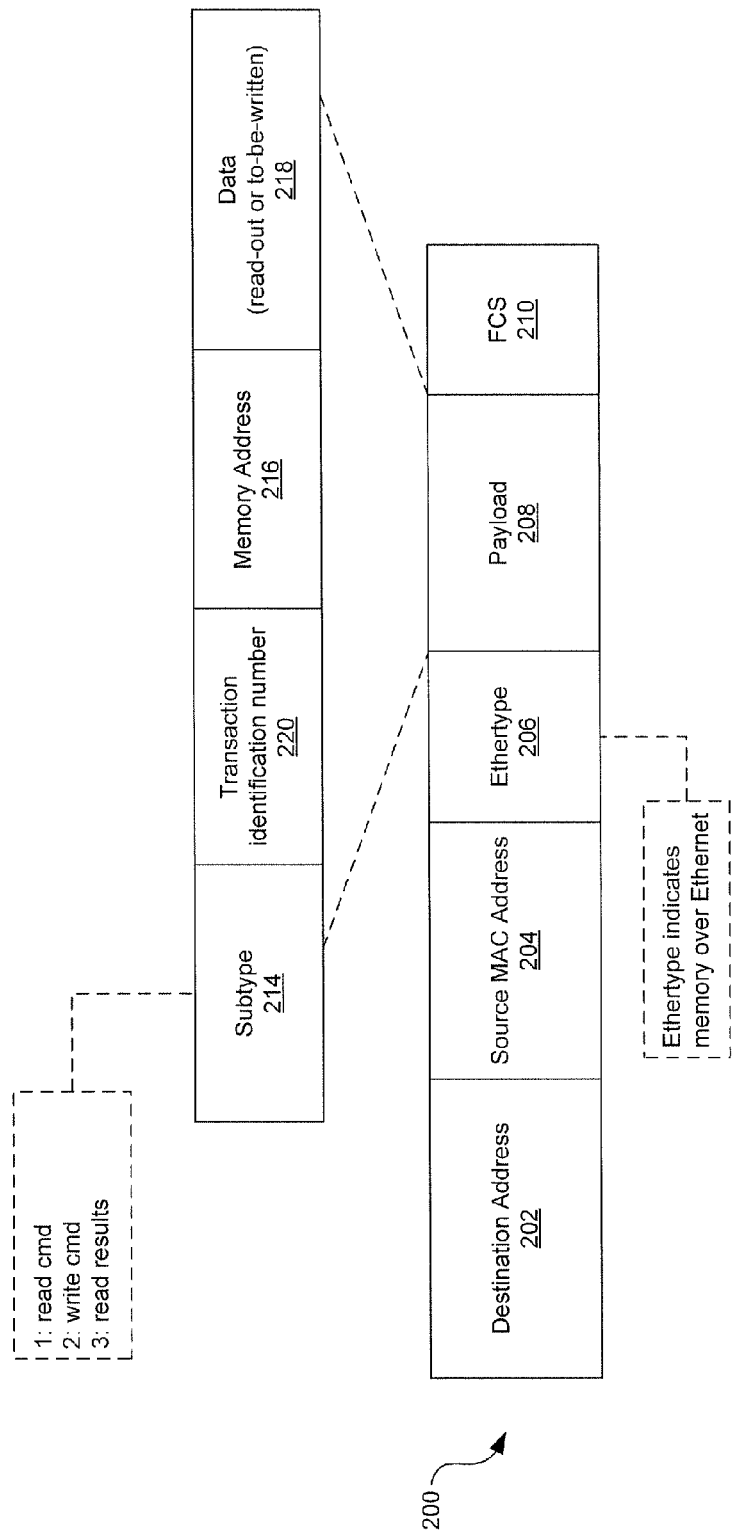
FIG. 2 is a diagram illustrating an exemplary frame comprising memory access information for accessing memory over Ethernet, in accordance with an embodiment of the invention.

FIG. 2 is a diagram illustrating an exemplary frame comprising memory access information for accessing memory over Ethernet, in accordance with an embodiment of the invention. Referring to FIG. 2, the Ethernet frame 200 may comprise memory access information encapsulated in one or more fields; exemplary fields comprising a destination address field 202, a source address field 204, an Ethertype field 206, a payload 208, and a frame check sequence (FCS) 210.

The destination address field 202 may comprise information that may be utilized to identify the node that the frame is to be sent to and/or the memory address associated with the destination node to be written to and/or read from. The source address 204 field may comprise information that may be utilized to identify the node that originated the packet.

The Ethertype 206 may be utilized to identify the type and/or nature of the data contained in the payload 208. In one embodiment of the invention, the Ethertype field may indicate that frame 200 is associated with a virtual memory access and, consequently, that the payload 208 may comprise one or more of a subtype field 214, a memory address 216, a transaction identification number 220, and/or data 218, which may be to-be-written data for a write operation or read-out data for a read operation.

The subtype field 214 may indicate, for example, whether the frame 200 comprises a read command, a write command, or read-out data from a read command. In instances that the subtype field 214 indicates that the frame 200 comprises a write command, the subtype field 214 may also indicate a type and/or amount of data to be written, whether the frame 200 comprises data to-be-written 218, and/or may indicate a number of subsequent frames that comprise additional data to-be-written. In this regard, the data to be written may span multiple frames in instances that large amounts of data are burst written to memory. In the exemplary embodiment of the invention that is depicted, a subtype of '1' corresponds to a read command, a subtype of '2' corresponds to a write command, and a subtype of '3' corresponds to a frame comprising read-out data. However, the invention is not limited with regard to the values, types, and/or number of subtypes.

The transaction identification field 220 may comprise a number that enable uniquely correlating a particular read command with particular read-out data.

The memory address field 216 may indicate a memory address to which data is to be written or read from. The memory address field 216 may comprise a variable number of bits corresponding to the size of the memory.

In instances the frame 200 comprises a write command, the payload 208 may contain data to be written to memory. In instances the packet comprises a read command, the payload 208 may contain, for example, no data or may contain padding bits. For read responses, the payload 208 may comprise data read out from memory.

The FCS 210 may comprise information that may be utilized to provide error detection for the packet. The FCS 210 may comprise, for example, a CRC or a checksum.

Figure 3:
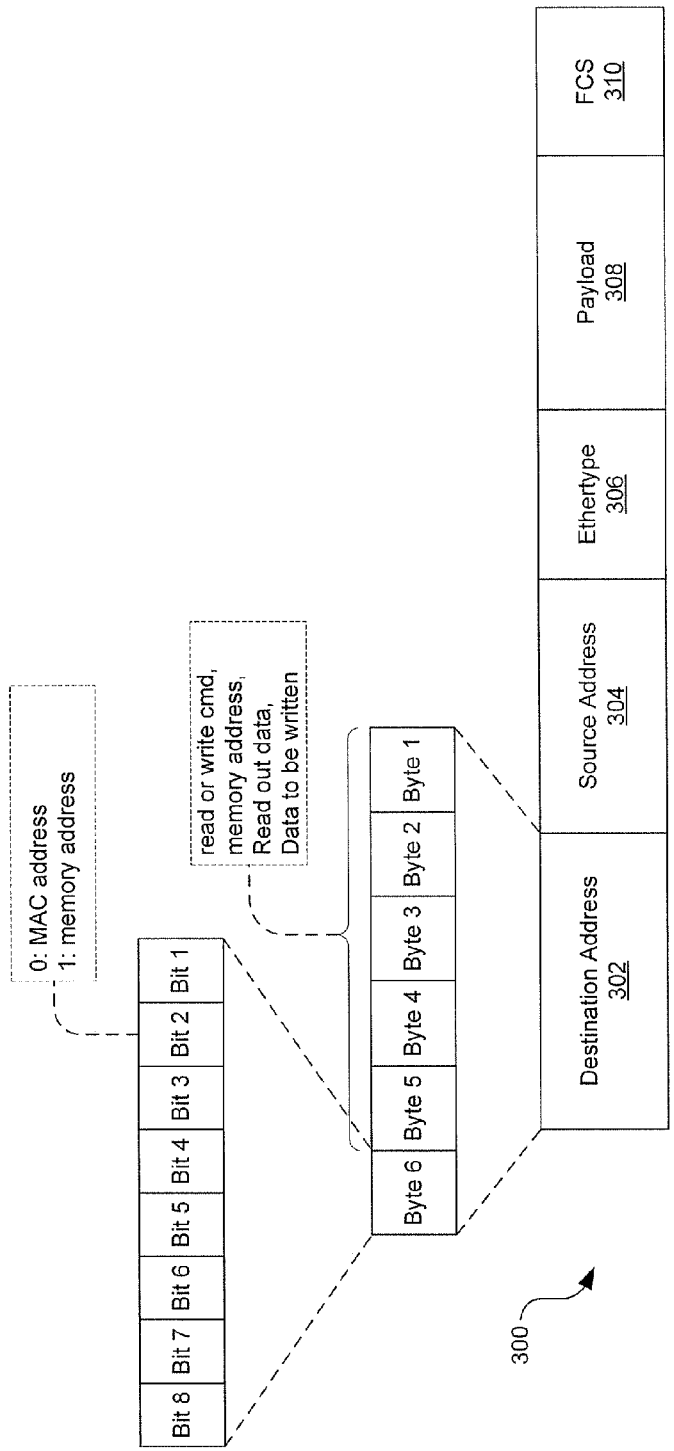
FIG. 3 is a diagram illustrating an exemplary frame comprising memory access information for accessing memory over Ethernet, in accordance with an embodiment of the invention.

FIG. 3 is a diagram illustrating an exemplary frame comprising memory access information for accessing memory over Ethernet, in accordance with an embodiment of the invention. Referring to FIG. 3, the Ethernet frame 300 may comprise memory access information encapsulated in one or more fields; exemplary fields comprising a destination address field 301, a source address field 304, an Ethertype field 304, a payload 308, and a frame check sequence (FCS) 310.

The destination address field 302 may comprise eight bytes. In various embodiments of the invention, bit 2 of byte 6 of the destination address 302 may be a 1 to indicate that a locally administered address space is being utilized. In this manner, the destination address 302 may not be a globally unique address assigned by the IEEE, but rather, may comprise a memory address that may be unique to a memory location in a network, to a memory location in a subnetwork, and/or to a memory location in network node that receives that frame 300. In this regard, one or more of bytes 6 through byte 1 may comprise a memory address. Also, one or more bits of the destination address 302 may indicate whether the frame 300 in associated with a write or read operation and/or indicate whether the frame comprises data to be written and/or read-out data.

The Ethertype 306 may comprise a conventional Ethertype field or may be the same as the Ethertype 206 described with respect to FIG. 2. The payload 308 may comprise a conventional payload field or may be the same as the payload 208 described with respect to FIG. 2. The FCS 310 may be the same as the FCS 210 described with respect to FIG. 2.

Figure 4:
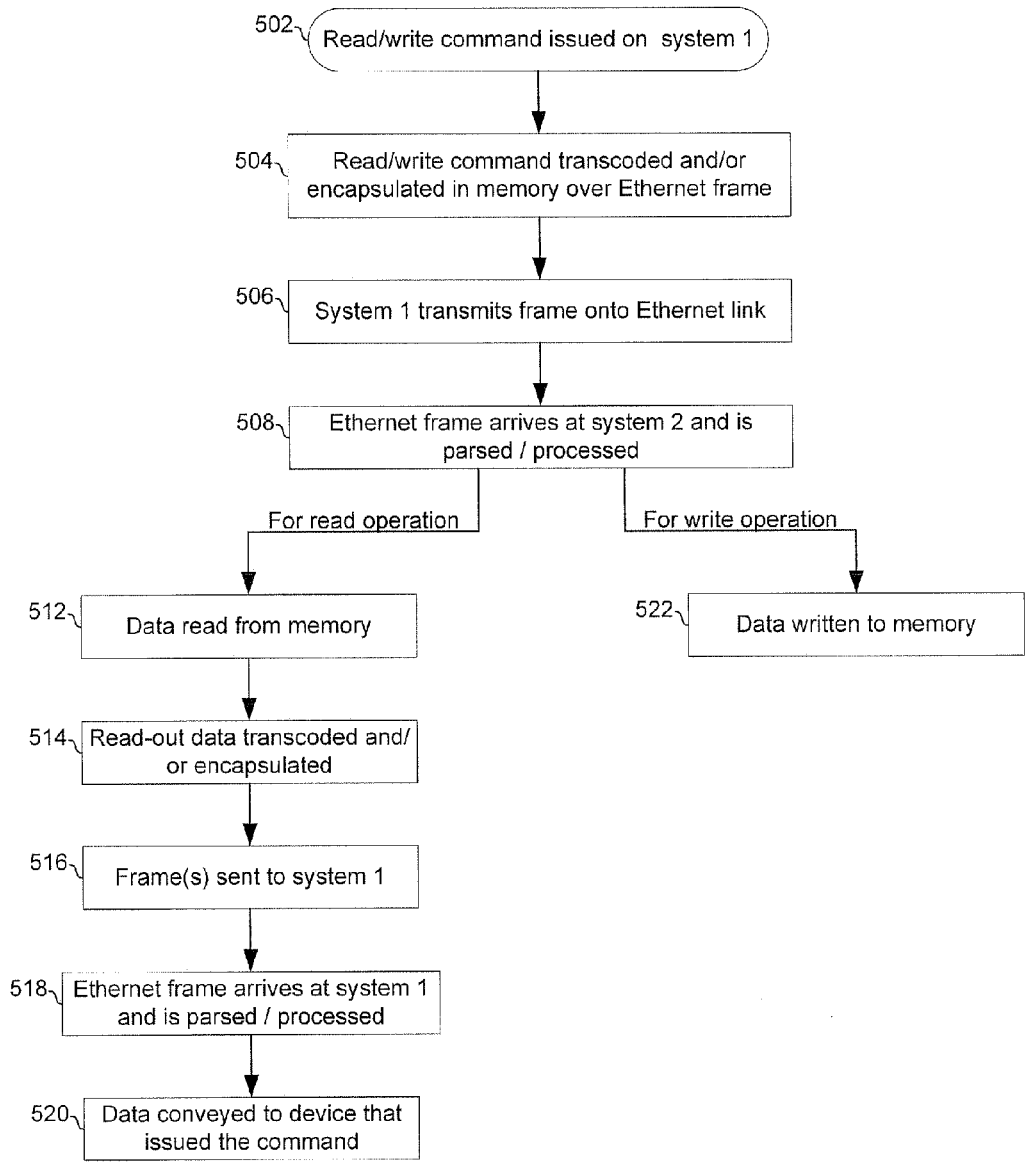
FIG. 4 is a flow chart illustrating exemplary steps for virtual memory accesses over native Ethernet, in accordance with an embodiment of the invention.

FIG. 4 is a flow chart illustrating exemplary steps for virtual memory accesses over native Ethernet, in accordance with an embodiment of the invention. Referring to FIG. 4, the exemplary steps may begin with step 502 when a memory read or memory write command may be issued in a first networking device. For example, the GPU 104a or the CPU 102a of the networking device 100a (FIG. 1A) may issue a read or write. Subsequent to step 502, the exemplary steps may advance to step 504.

In step 504, the read or write command may be transcoded and/or encapsulated into an Ethernet frame. In this regard, the frame may be formatted such as the Ethernet frame 200 (FIG. 2) or the frame 300 (FIG. 3). Subsequent to step 504, the exemplary steps may advance to step 506.

In step 506, the first networking device may transmit the generated Ethernet frame onto a physical medium to a second networking device. For example, the networking device 100a (FIG. 1A) may transmit the frame 200 (FIG. 2) or the frame 300 (FIG. 3) to the networking device 100b (FIG. 1A) or the networking device 150 (FIG. 1B) via the Ethernet links 122. Subsequent to step 506, the exemplary steps may advance to step 508.

In step 508, the frame may arrive at the second networking device and the frame may be parsed and/or processed to extract and/or recover the read or write command. In this regard, one or more fields of the frame may be inspected to determine whether the frame comprises a read command or a write command, and in instances of a write command, whether the frame comprises data to be written to memory. In instances that the command is a write command, the exemplary steps may advance to step 522.

In step 522, the address and to-be-written data may be placed on a corresponding address and data busses of the memory in the second networking device and the write operation may be triggered. For example, the frame 200 may be received by the LAN subsystem 116c of the networking device 150 and the LAN subsystem 116c may extract the write address and data from the payload 208 and convey the address and data to the MMU 152. The MMU 152 may place the write address on an address bus of the memory 154, place the data on a data bus of the memory 154, and the write operation may be triggered.

Returning to step 508, in instances that the command is a read command, the exemplary steps may advance to step 512. In step 512, the address may be placed on a corresponding address bus of the memory in the second networking device and the read operation may be executed. For example, the frame 200 may be received by the LAN subsystem 116c of the networking device 150 and the LAN subsystem 116c may extract the read address from the field 216 and convey the address and data to the MMU 152. The MMU 152 may place the read address on an address bus of the memory 154 and trigger the read operation. Subsequent to step 508, the exemplary steps may advance to step 514.

In step 514, the data read out onto the data bus of the memory, may be conveyed to the LAN subsystem where it may be encapsulated into one or more Ethernet frames. For example, data may be read out of the memory 154 and conveyed to the LAN subsystem 116c by the MMU 152. The LAN subsystem 116c may encapsulate the read-out data into one or more frames formatted such as the frames 200 or 300. Subsequent to step 514, the exemplary steps may advance to step 516.

In step 516, the frames containing the read-out data may be transmitted to the first networking device via the physical medium. In step 518, the frame(s) may arrive at the networking device 518 and may be parsed and/or processed to extract the read-out data. In step 520, the read-out data may be conveyed to the first networking device or portion of the first networking device that issued the command. For example, the read-out data may be conveyed to the GPU 104a or the CPU 102a that issued the read command.

In various aspects of a method and system for utilizing native Ethernet as a memory interconnect, a first networking device 100a may transcode a memory read command and/or a memory write command to memory access information and encapsulate the memory access information within in one or more fields of an Ethernet frame 200 or 300. The memory access information may be communicated over an Ethernet link 122 to a second networking device 100b where it may be utilized to access memory 108b that is associated with the memory read command and/or the memory write command. For example, the memory access information may indicate an address of the memory 108b to be accessed, whether a read operation and/or a write operation is to be performed, and/or whether the frame 200 or 300 comprises data to be written to the memory 108b. Exemplary fields of the frame comprise one or more of: a destination address field 202, an Ethertype field 206, a payload field 208, and a subtype field 214. The destination address field 202 may indicate that a locally administered address space is utilized.

Upon receiving the Ethernet frame 200 or 300, the second networking device 100b may determine, based on one or more fields of the received Ethernet frame 200 or 300, whether the received Ethernet frame 200 or 300 comprises a memory read command and/or a memory write command that was previously transcoded and encapsulated within the received Ethernet frame 200 or 300. Based on a result of the determination, a memory read operation and/or a memory write operation may be performed on the memory 108b to be accessed. In instances that the Ethernet frame 200 or 300 comprises a memory read command, a second Ethernet frame comprising data read-out from the memory 108b may be generated and communicated to the first networking device 100a.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for utilizing native Ethernet as a virtual memory interconnect.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   performing by circuitry in a first networking device:
   identifying a memory access command for accessing a virtual memory address;
   translating the virtual memory address to a physical memory address;
   determining that the physical memory address translated from the virtual memory address is within a memory of a second networking device, and in response:
   transcoding the memory access command to memory access information;
   encapsulating the memory access information in an Ethernet frame, wherein the memory access information is usable by the second networking device to perform the memory access command on the memory of the second networking device and wherein the memory access information indicates that the Ethernet frame is associated with a virtual memory access; and
   communicating the Ethernet frame comprising the memory access information to the second networking device over an Ethernet link.

2. The method according to claim 1, comprising encapsulating the memory access information in one or more fields of the Ethernet frame, including: a destination address field, an Ethertype field, a payload field, a transaction identification field, or a subtype field.

3. The method according to claim 2, wherein the destination address field indicates that a locally administered address space is utilized.

4. The method according to claim 1, wherein the memory access information indicates the physical memory address of the memory of the second networking device to be accessed by the memory access command.

5. The method according to claim 1, wherein the memory access information indicates whether the memory access command comprises a memory read command or a memory write command.

6. The method according to claim 1, wherein memory access information indicates whether the Ethernet frame comprises data to be written to the memory of the second networking device.

7. A system for networking, the system comprising:
   circuitry operable to:
   identify a memory access command for accessing a virtual memory address;
   translate the virtual memory address to a physical memory address;
   determine that the physical memory address translated from the virtual memory address is within a memory of a second networking device, and in response:
   transcode the memory access command to memory access information;
   encapsulate the memory access information in an Ethernet frame, wherein the memory access information is usable by the second networking device to perform the memory access command on the memory of the second networking device and wherein the memory access information indicates that the Ethernet frame is associated with a virtual memory access; and
   communicate the Ethernet frame comprising the memory access information to the second networking device over an Ethernet link.

8. The system according to claim 7, where the circuitry is operable to encapsulate the memory access information in one or more fields of the Ethernet frame, including: a destination address field, an Ethertype field, a payload field, a transaction identification field, or a subtype field.

9. The system according to claim 8, wherein the destination address field indicates that a locally administered address space is utilized.

10. The system according to claim 7, wherein the memory access information indicates the physical memory address of the memory of the second networking device to be accessed by the memory access command.

11. The system according to claim 7, wherein the memory access information indicates whether the memory access command comprises a memory read command or a memory write command.

12. The system according to claim 7, wherein the memory access information indicates whether the Ethernet frame comprises data to be written to the memory of the second networking device.

* * * * *